US012636645B2

(12) United States Patent
Govyadinov et al.

(10) Patent No.:  US 12,636,645 B2
(45) Date of Patent:  May 26, 2026

(54) MICROFLUIDIC DEVICES

(71) Applicant: Hewlett-Packard Development Company, L.P., Spring, TX (US)

(72) Inventors: Alexander Govyadinov, Corvallis, OR (US); Dennis M. Lazaroff, Corvallis, OR (US); Brett E. Dahlgren, Corvallis, OR (US); Stefan Enr Lucchini, Corvallis, OR (US); Tod Woodford, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 884 days.

(21) Appl. No.: 17/910,130

(22) PCT Filed: Mar. 31, 2020

(86) PCT No.: PCT/US2020/025883
§ 371 (c)(1),
(2) Date: Sep. 8, 2022

(87) PCT Pub. No.: WO2021/201836
PCT Pub. Date: Oct. 7, 2021

(65) Prior Publication Data
US 2023/0123792 A1     Apr. 20, 2023

(51) Int. Cl.
*G01N 21/62* (2006.01)
*B01L 3/00* (2006.01)
*G01N 21/64* (2006.01)
(52) U.S. Cl.
CPC ... *B01L 3/502715* (2013.01); *B01L 3/502707* (2013.01); *G01N 21/64* (2013.01); *B01L 2300/042* (2013.01); *B01L 2300/0663* (2013.01); *B01L 2300/0861* (2013.01); *B01L 2300/168* (2013.01); *G01N 2021/6471* (2013.01)

(58) Field of Classification Search
None
See application file for complete search history.

(56) References Cited

U.S. PATENT DOCUMENTS

| | | | |
|---|---|---|---|
| 8,486,636 B2 | 7/2013 | Enzelberger et al. | |
| 9,631,229 B2 | 4/2017 | Stroganov et al. | |
| 2006/0078929 A1 | 4/2006 | Bickel et al. | |
| 2007/0069347 A1* | 3/2007 | Lin ..................... | H01L 23/3192 |
| | | | 257/315 |
| 2010/0055666 A1 | 3/2010 | Wimberger-Friedl et al. | |
| 2010/0196206 A1* | 8/2010 | Lee .................... | G01N 21/6454 |
| | | | 427/58 |
| 2010/0284088 A1* | 11/2010 | Zambov ................ | G02B 5/285 |
| | | | 427/163.1 |

(Continued)

FOREIGN PATENT DOCUMENTS

| | | |
|---|---|---|
| CN | 209296581 U | 8/2019 |

*Primary Examiner* — Paul S Hyun
(74) *Attorney, Agent, or Firm* — Foley & Lardner LLP

(57) ABSTRACT

The present disclosure is drawn to microfluidic devices. The microfluidic device includes a microfluidic well, a layered composite stack, and an optical sensor. The layered composite stack includes an optical filter composited with an etch-stopping layer. The optical filter defines the microfluidic well. The optical sensor is associated with the microfluidic well and has the optical filter positioned therebetween.

8 Claims, 3 Drawing Sheets

(56)                    References Cited

U.S. PATENT DOCUMENTS

| | | | |
|---|---|---|---|
| 2011/0053151 A1* | 3/2011 | Hansen | G06F 3/04842 |
| | | | 435/6.19 |
| 2014/0183044 A1* | 7/2014 | Renaudot | C25D 1/12 |
| | | | 204/483 |
| 2016/0258944 A1 | 9/2016 | Wiktor | |
| 2017/0082544 A1 | 3/2017 | Van Dorpe et al. | |

* cited by examiner

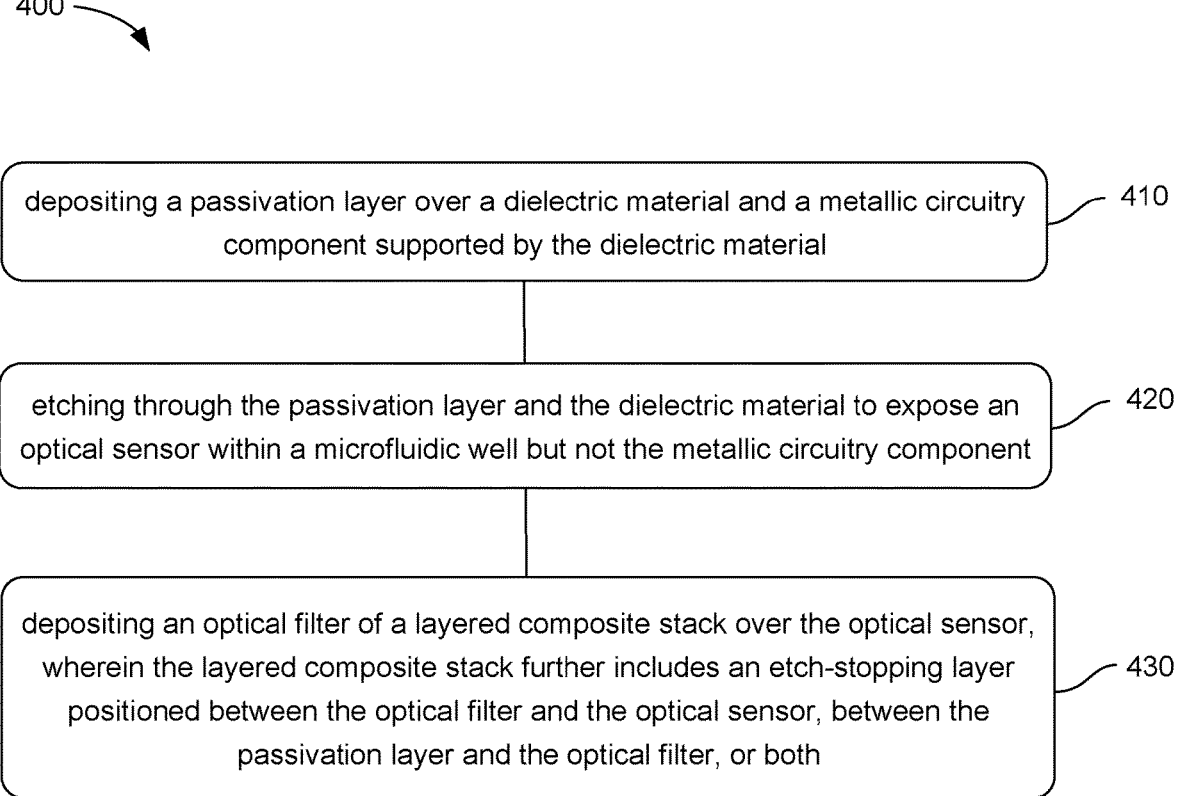

400 depositing a passivation layer over a dielectric material and a metallic circuitry component supported by the dielectric material — 410 etching through the passivation layer and the dielectric material to expose an optical sensor within a microfluidic well but not the metallic circuitry component — 420 depositing an optical filter of a layered composite stack over the optical sensor, wherein the layered composite stack further includes an etch-stopping layer positioned between the optical filter and the optical sensor, between the passivation layer and the optical filter, or both — 430

FIG. 4

MICROFLUIDIC DEVICES

BACKGROUND

Microfluidic devices can exploit chemical and physical properties of fluids on a microscale. These devices can be used for research, medical, and forensic applications, to name a few, to evaluate or analyze fluids using very small quantities of sample and/or reagent to interact with the sample than would otherwise be used with full-scale analysis devices or systems.

BRIEF DESCRIPTION OF THE DRAWINGS

FIG. 4 is a flow diagram illustrating an example method of manufacturing a microfluidic device in accordance with the present disclosure.

DETAILED DESCRIPTION

Figure 1:
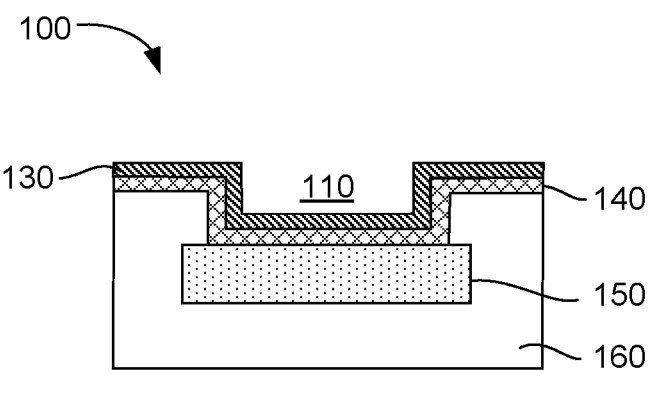
FIG. 1 graphically illustrates a schematic cross-sectional view of an example microfluidic device in accordance with the present disclosure.

Microfluidic devices can be used in a variety of applications, including biotechnology, drug screening, clinical diagnostic testing, etc. However, manufacturing microfluidic devices can be labor intensive and/or can be difficult to quickly and repeatedly produce microfluidic devices with accuracy and precision. For example, manufacturing methods can involve etching. Over-etching or under-etching can result in faulty microfluidic devices. Over-etching can, in one example, result in exposed regions over electrical components that can cause the microfluidic device to short circuit. Under-etching can result in poor etch uniformity.

The present disclosure is drawn to microfluidic devices, methods of manufacturing a microfluidic device, and systems for conducting a biological assay. A microfluidic device, for example, includes a microfluidic well, a layered composite stack, and an optical sensor. In this example, the layered composite includes an optical filter composited with an etch-stopping layer. The optical filter defines the microfluidic well. The optical sensor is optically associated with the microfluidic well and has the optical filter positioned therebetween. In an example, the etch-stopping layer can be optically transparent and can be positioned between the optical sensor and the optical filter. In another example, the layered composite stack can be devoid of the etch-stopping layer along the microfluidic well but can be composited with the optical filter at a region beyond the microfluidic well. In yet another example, a metallic circuitry component can be positioned beyond the microfluidic well that can be covered by a passivation layer. The etch-stopping layer can extend beyond the optical filter and can cover the passivation layer over the metallic circuitry component. In a further example, the optical filter can be selected from a dichroic filter, absorptive filter, monochromatic filter, bandpass filter, Fabry-Perot etalon, antireflective coating, bandstop filter, or a combination thereof. In one example, the optical filter can be a dichroic filter which includes from 4 to 250 alternating layers of two or different types of optically transparent materials with different refractive indexes. The etch-stopping layer can also be optically transparent. The two different types of optically transparent material of the dichroic filter can be different than the optically transparent material of the etch-stopping layer. In another example, the etch-stopping layer can include an optically transparent material selected from titanium dioxide, zirconium oxide, hafnium oxide, aluminum oxide, indium oxide, tin (IV) oxide, tantalum oxide, silicon carbide, titanium nitride, or a combination thereof. In yet another example, the etch-stopping layer can have a thickness ranging from 0.05 μm to 1 μm.

A method of manufacturing a microfluidic device, in another example, includes depositing a passivation layer over a dielectric material and a metallic circuitry component supported by the dielectric material, and etching through the passivation layer and the dielectric material to expose an optical sensor but not the metallic circuitry component. The method further includes depositing an optical filter of a layered composite stack over the optical sensor. In this example, the layered composite stack further includes an etch-stopping layer positioned between the optical filter and the optical sensor, between the passivation layer and the optical filter, or both. In one example, this method can further include removing a portion of the optical filter at a location other than over the optical sensor, leaving the etch-stopping layer extending beyond the optical filter. In an example, the optical filter can be applied directly to the optical sensor. In another example, the etch-stopping layer can be applied directly to the optical sensor with the optical filter positioned thereon over the optical sensor.

In another example, a system for conducting a biological assay includes a microfluidic device with microfluidic chamber, and the system further includes an excitation source. The microfluidic device includes a microfluidic as part of the microfluidic chamber, a layered composite stack, and an optical sensor. The layered composite stack includes an optical filter composited with an etch-stopping layer. The optical filter defines the microfluidic well. The optical sensor is optically associated with the microfluidic well and has the optical filter positioned therebetween. The excitation source is positioned to emit electromagnetic energy to be received by the optical sensor through the microfluidic well. In one example, the optical sensor can be associated with a fluorescence detector. In yet another example, the etch-stopping layer can be optically transparent and can be applied directly to the optical sensor with the optical filter positioned thereon over the optical sensor.

It is also noted that when discussing the microfluidic devices, the methods for manufacturing a microfluidic device, or the systems for conducting a biological assay, such discussions of one example are to be considered applicable to the other examples, whether or not they are explicitly discussed in the context of that example. Thus, in discussing a layered composite stack in the context of the microfluidic device, such disclosure is also relevant to and directly supported in the context of the method of manufacturing a microfluidic device and a system for conducting a biological assay, and vice versa.

Turning now to the FIGS. for further detail, as an initial matter, there are several components of the microfluidic devices shown that are common to multiple examples, and thus, the common reference numerals are used to describe various features. Thus, a general description of a feature in the context of a specific FIG. can be relevant to the other example FIGS. shown, and as a result, individual components need not be described and then re-described in context of another FIG. In the following example descriptions, FIGS. 1-5 can be considered simultaneously in the description of the FIGS. to the extent relevant by a common reference numeral, for example.

With more specific reference to FIG. 1, a schematic cross-sectional view of example microfluidic devices 100 is shown. The microfluidic devices can include a microfluidic well 110, a layered composite stack including an optical filter 130 composited with an etch-stopping layer 140, and an optical sensor 150. The optical sensor can be integrated with or applied on a substrate 160, for example.

Figure 2:
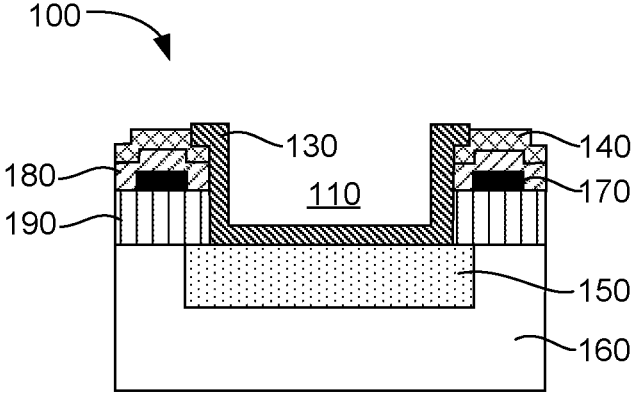
FIG. 2 graphically illustrates a schematic cross-sectional view of an example microfluidic device in accordance with the present disclosure.
Figure 3:
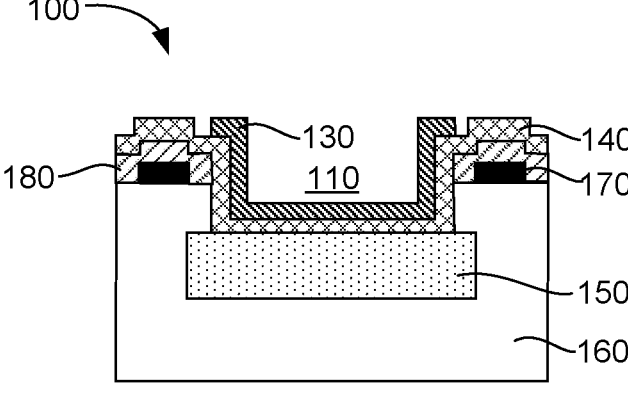
FIG. 3 graphically illustrates a schematic cross-sectional view of an example microfluidic device in accordance with the present disclosure.

In other examples, such as those shown in FIG. 2 and FIG. 3, the microfluidic devices 100 can also include a microfluidic well 110, a layered composite stack including an optical filter 130 composited with an etch-stopping layer 140, and an optical sensor 150 integrated with or applied on a substrate 160. In FIG. 2, the etch-stopping layer is composited with the optical filter around a lip of the microfluidic well. In FIG. 3, on the other hand, the etch-stopping layer is also composited with the optical filter within the microfluidic well. In both examples, metallic circuitry 170 and a passivation layer (which can be a dielectric material) 180 are also shown as being included by way of example. In FIG. 2, walls of the microfluidic well can be supported, for example, by a passivation layer 190, which can be multiple layers of passivation material. In fact, any of the layers shown can actually be multiple layers of material to create the bulk of the structure shown and described. With respect to FIGS. 1-3, any combination of these arrangements can be prepared or others, provided there is an etch-stopping layer composited with an optical filter somewhere along a length of the optical filter, or example.

The dimensions of the microfluidic well can vary based on desired application. In one example, the microfluidic well can have a length at the widest location along cross-sectional area (x-y axes) from 0.5 mm to 5 mm, from 1 mm to 5 mm, from 1.5 mm to 3 mm, from 0.5 mm to 2.5 mm, or from 0.75 mm to 3.5 mm. The width along at the shortest location can be the same as the length, or shorter, e.g., for more elongated cross-sectional shapes along the x-y axes. The cross-sectional area dimension can be circular, oval, rectangular, square, or of any other dimension desired or convenient for a particular application. The height of the microfluidic well can be, for example, from 10 $\mu$m to 1 mm, from 10 $\mu$m to 50 $\mu$m, from 50 $\mu$m to 200 $\mu$m, from 100 to 1 mm, from 400 $\mu$m to 800 $\mu$m or from 500 $\mu$m to 1 mm, for example. Microfluidic well volumes can be, for example, from 0.1 $\mu$L to 100 $\mu$L, from 1 $\mu$L to 5 $\mu$L, from 5 $\mu$L to 100 $\mu$L, from 0.1 $\mu$L to 25 $\mu$L, from 50 $\mu$L to 100 $\mu$L, or from 25 $\mu$L to 75 $\mu$L, though volumes outside of these ranges can also be used.

In some examples, the microfluidic well can be a well within a larger microfluidic chamber, e.g., with fluid within the microfluidic chamber being within the microfluidic well but also extending above the microfluidic well and laterally with respect to the microfluidic well over electronic components and passivation layers coated thereon. An example of this configuration is shown with the microfluidic well 110, the larger microfluidic chamber 115, and a lid 195, which are illustrated by example at 100 in FIG. 5. Notably, FIGS. 1-3 can also include these structures as well. In other examples, the microfluidic well can be part of a microfluidic channel of a microfluidic device. Thus, if the chamber shown at 115 in FIG. 5 were extended laterally, as indicated as the phantom lines, the microfluidic chamber would be elongated, and thus, could be referred to as a microfluidic channel. That stated, for purposes of the present disclosure, a microfluidic channel can be considered to be one more specific type of a microfluidic chamber. In these or other examples, the microfluidic well can have a length that can range from 2 mm to 75 mm. In yet other examples the microfluidic well can have a length that can range from 10 mm to 30 mm, from 2 mm to 5 mm, from 4 mm to 20 mm, or from 25 mm to 75 mm. The microfluidic well can be elongated and can have a length to width aspect ratio and/or a length to height aspect ratio from 1:1 to 200:1. In yet another example, the microfluidic well can be an elongated chamber that can have a length to width aspect ratio and/or a length to height aspect ratio from 2:1 to 200:1, from 3:1 to 200:1, from 1:1 to 10:1, or from 1:1 to 2:1, for example.

In some examples, the microfluidic well can be fluidly coupled to an inlet port and an outlet port, e.g., the microfluidic chamber containing the microfluidic well can be associated with an inlet port and/or an outlet port, or the microfluidic well itself can be associated with the inlet port and/or the outlet port. The microfluidic well (or microfluidic chamber containing the microfluidic well) can have a larger or a smaller cross-sectional area than the inlet port or the outlet port. In yet other examples, the microfluidic well (or microfluidic chamber) can have an opening that can serve as both an inlet and an outlet.

The microfluidic well can be defined by the optical filter of the layered composite stack. In some examples, the optical filter can be composited with an etch-stopping layer along the microfluidic well, as exemplified in FIGS. 1 and 3. In yet other examples, the optical filter of the layered composite stack can be devoid of the etch-stopping layer along the microfluidic well, as shown in FIG. 2, but can be composited with the optical filter at a region beyond the microfluidic well. In yet other examples, the optical filter can be composited with the etch-stopping layer at an area along the side walls of the microfluidic well and at a region beyond the microfluidic well, but can be devoid of the etch-stopping layer where the optical filter meets the optical sensor.

The optical filter can selectively filter and transmit wavelengths of light. In some examples, the optical filter can reflect or absorb and contain wavelengths ranging from 425 nm to 525 nm and can transmit wavelengths from 525 nm to 700 nm. In an example, the optical filter can reflect or absorb all wavelengths of less than 500 nm. In another example, the optical filter can transmit wavelengths ranging from 500 nm to 600 nm. The ability of an optical filter to reflect or absorb wavelengths of light can prevent excitation light from reaching the optical sensor; thereby, preventing interference with measured tests. The optical filter can be selected from a dichroic filter, absorptive filter, monochromatic filter, bandpass filter, Fabry-Perot etalon, antireflective coating, bandstop filter, or a combination thereof. In some examples, the optical filter can be selected from a dichroic filter, a bandpass filter, or a bandstop filter. In yet another example, the optical filter can include a dichroic filter.

When the optical filter is a dichroic filter, the dichroic filter can include alternating material layers of optically transparent materials, as illustrated schematically by horizontal cross-hatching in the figures. In some examples, the dichroic filter can include from 4 to 250 material layers, from 6 to 200 material layers, from 10 to 100 material layers, from 10 to 50 material layers, from 10 to 20 material layers, or from 4 to 40 material layers, or from 4 to 20 material layers. The alternating material layers can include different optically transparent materials. When there are more than two "alternating" materials layers, what is meant is that the same layer is not applied twice, but does not infer that the multiple layers be applied sequentially and in an alternating manner, though they may be applied sequentially and repetitively. The optically transparent materials can be chosen for their optical properties, structural properties, chemical properties, or a combination thereof, for example. In an example, the optically transparent materials can be selected from titanium dioxide, zirconium oxide, hafnium oxide, aluminum oxide, indium oxide, tin (IV) oxide, tantalum oxide, silicon carbide, silicon dioxide, silicon nitride, titanium nitride, or a combination thereof. In some examples, the material layers can include a combination of low refractive index materials and high refractive index materials, when considered with respect to one another. For example, a low refractive index value could be 1.5 and a high refractive index value could be 2. In another example, a low refractive index value could be 1 and the high refractive index value could be 1.5. The difference in refractive index can be used to determine relatively which material has a low refractive index and a high refractive index. The refractive index difference may be, for example, greater than 0.2, greater than 0.35, greater than 0.5, greater than 0.6.5, or greater than 0.8, for example. An example of a low refractive index materials can include aluminum oxide and an example of high refractive index materials can include titanium dioxide. In an example, the dichroic filter can include alternating layers of silicon dioxide and silicon nitride. In a further example, the dichroic filter can include alternating layers of titanium dioxide and titanium nitride.

The individual material layers of a dichroic filter can be less than 1 μm thick. In some examples, the individual material layers can have a thickness that can range from 5 nm to 900 nm, from 5 nm to 400 nm, from 5 nm to 350 nm, from 25 nm to 250 nm, from 50 nm to 500 nm, or from 300 nm to 900 nm. A thickness of the entire optical filter can range from 0.1 μm to 100 μm, from 1 μm to 10 μm, from 5 μm to 75 μm, or from 0.5 μm to 25 μm.

The optical filter can be composited with the etch-stopping layer. The etch-stopping layer can act as a protective layer that can prevent or slow etching with etch stopping chemicals during manufacture of the microfluidic device. A location of the etch-stopping layer can vary; however, a portion of the etch-stopping layer can be positioned over metallic circuitry components of a microfluidic device. The etch-stopping layer can act as a protective layer for the metallic circuitry components during manufacture of the microfluidic device.

In an example, the etch-stopping layer can include an optically transparent material at a portion of the etch-stopping layer that can be positioned between the optical sensor and the optical filter. In some examples, the etch-stopping layer may include optically transparent materials where a portion of the etch-stopping layer is positioned between the optical sensor and the optical filter and may include optically transparent or non-transparent materials where a portion of the etch-stopping layer falls outside of an area of the optical sensor. In further examples, where the etch-stopping layer does not interface with the optical sensor, the etch-stopping layer can include non-transparent materials or optically transparent materials.

Example materials for the etch-stopping layer can include titanium dioxide, zirconium oxide, hafnium oxide, aluminum oxide, indium oxide, tin (IV) oxide, tantalum oxide, silicon carbide, titanium nitride, or a combination thereof. In another example, the etch-stopping layer can include titanium oxide. In some examples, the optically transparent material of the etch-stopping layer can be different from the optically transparent materials of the optical filter. In some examples, the etch-stopping layer can include a material that cannot be etched or can be highly resistant to etching. These materials can prevent or slow etching through the etch-stopping layer when combined with specific etching chemicals, for example.

The etch-stopping layer can have a thickness ranging from 0.05 μm to 1 μm. In yet other examples, the etch-stopping layer can have a thickness from 0.1 μm to 1 μm, from 0.05 μm to 0.5 μm, or from 0.5 μm to 1 μm. The thicker the etch-stopping layer, the greater a time buffer provided during etching for a non-self-stopping etch layer; however, thicker layers, over 1 μm, can interfere with the functioning of the optical filter. In some examples, a thickness of the etch-stopping layer can be thicker than, the same thickness as, or less thick than a thickness of the optical filter.

The optical sensor can be optically associated with the microfluidic well. In some examples, the optical sensor can be positioned to receive fluorescent emissions when passed through the optical filter or the optical filter and an optically transparent etch-stopping layer. The optical sensor can detect the fluorescent emission and in one example, can be sized to span the entire area under the microfluidic well. In another example, the optical sensor can be sized to span one-quarter to three-quarters of the area under the microfluidic well. In a further example, the optical sensor can be sized to span half to three-quarters of the area under the microfluidic well.

In one example, the optical sensor can include a pin-photodiode, an avalanche photodiode, a phototransistor, a multi-junction photodiode, a charge coupling device, a complimentary metal-oxide semiconductor, a photo-sensor, a photo-resistor, a pyroelectric detector, a thermopile, or a combination thereof. In one other example, the optical sensor can include a pin-photodiode. In another example, the optical sensor can include a multi-junction photodiode.

In some examples the optical sensor can be recessed in a substrate of the microfluidic device. A variety of substrate materials can be used. For example, the substrate can include a material selected from glass, quartz, polyamide, polydimethylsiloxane, silicon, SUB, polystyrene, polycarbonate, polymethyl methacrylate, polyethylene, poly(ethylene glycol) diacrylate, polypropylene, perfluoroalkoxy, fluorinated ethylene propylene, polyurethane, cyclic olefin polymer, cyclic olefin copolymer, phenolics, or a combination thereof. In an example, the substrate can include polydimethylsiloxane. In another example, the substrate can include polycarbonate. In yet another example, the substrate can include silicon.

The substrate can include any variety of configurations. In one example, the substrate can be configured as a rectangle, a square, or a polygon. In some examples, the substrate can include a U-shape cut-out that can form sidewalls of the microfluidic device. A thickness of the substrate can vary and is not limited. In one example, the substrate can have a thickness at the smallest diameter ranging from 0.05 mm to 10 mm. In yet other examples, a thickness of the substrate at the smallest diameter can vary from 0.5 mm to 2 mm, from 1 mm to 5 mm, from 0.05 mm to 0.8 mm, or from 2 mm to 10 mm.

In some examples, the substrate can be configured to include an inlet port and an outlet port that can be fluidly connected to the microfluidic well. The inlet port and the outlet port can be used to provide fluid to (via the inlet port) and pass fluid from (via the outlet port) the microfluidic well. It is noted that the terms "inlet" and "outlet" do not infer that these ports interact with the microfluidic well (or a larger microfluidic chamber that contains the microfluidic well) in one direction, though that could be the case. In some instances, there may be occasion for the fluid to flow "backwards" or "bi-directionally," and thus the terms "inlet port" and "outlet port" can be used because at some point during operation, these two ports act as inflow of fluid and outflow of fluid, respectively, relative to the microfluidic well or microfluidic chamber.

In some examples, the microfluidic device can further include a dielectric material. The dielectric material can form the sidewalls of the microfluidic well and/or can act as an insulator for electrical components of a microfluidic device. The dielectric material can have a thickness that can range from 0.05 mm to 10 mm. In yet other examples, a thickness of the dielectric material at the smallest diameter can vary from 0.5 mm to 10 mm, from 0.5 mm to 2 mm, from 1 mm to 5 mm, from 0.05 mm to 0.8 mm, or from 2 mm to 10 mm.

In some examples, the microfluidic device can further include integrated electrical elements positioned to interact with a fluid when a fluid is located in the microfluidic well. In some examples, the integrated electrical elements can include circuitry, resistors, transistors, capacitors, inductors, diodes, light emitting diodes, transistors, converters, conductive wires, conductive traces, photosensitive components, thermal sensitive components, semiconductor, and the like. In one example, the microfluidic device can include a heating element, circuitry, complimentary metal-oxide-semiconductor, or a combination thereof. These components can be in electrical communication with circuitry or other components inside or outside of the microfluidic device via a wire, a trace, a network of wires, a network of traces, an electrode, a conductive pad, and/or any other electrical communication structure that may or may not be embedded in the microfluidic device. In one example, the microfluidic device can further include a metallic circuitry component can be positioned beyond the microfluidic well, but may still be within a larger microfluidic chamber volume. The metallic circuitry can be covered by a passivation layer, for example, to provide protection to the metallic circuitry when a fluid is present.

The passivation layer can include a material selected from silicon carbide, silicon dioxide, or a combination thereof. The passivation layer can have a wide variety of thickness, and can be one or multiple layers joined together as a unitary structure, for example. The passivation layer over the metallic circuitry can be covered by the etch-stopping layer.

The microfluidic device presented herein can be utilized for fluorescing biological assays. Examples of fluorescing biological assays can include nucleic acid micro-assays, bio-sensing assays, cell assays, PCR, drug delivery research, energy transfer-based assays, fluorescence in situ hybridization (FISH), fluorescent reporter assays, fluorescent spectroscopy, quantum dot detection of cancer markers/cells, detection of reaction oxygen species, protein interactions, prion research, detection of viral antigens, detection of pathogens, detection of toxins, protein/immunological assays, chemi-fluorescent enzyme-linked immunosorbent assays (ELISA), antibody micro-assays, protein micro-assays, glycine/lectin assays, and the like for example. In some examples, the microfluidic device can be configured as a micro-reactor assembly. For example, the microfluidic device can be configured as a PCR micro-reactor. In yet other examples, the microfluidic device can be configured as part of a lab on chip device.

In accordance with yet other examples, as shown in FIG. 4, a method for manufacturing a microfluidic device is presented. The method can include depositing 410 a passivation layer over a dielectric material and a metallic circuitry component supported by the dielectric material; etching 420 through the passivation layer and the dielectric material to expose an optical sensor but not the metallic circuitry component; depositing 430 an optical filter of a layered composite stack over the optical sensor. The layered composite stack including an etch-stopping layer positioned between the optical filter and the optical sensor, between the passivation layer and the optical filter, or both. In one example, the method can also include removing a portion of the optical filter at a location other than over the optical sensor, leaving the etch-stopping layer extending beyond the optical filter. The depositing steps of the method are not particularly limited and can include any methods for adhering layers to one another, such as using an adhesive, heat assisted bonding, chemical vapor deposition, spin coating, or the like. In an example, the optical filter can be applied directly to the optical sensor. In another example, the etch-stopping layer can be applied directly to the optical sensor with the optical filter positioned over the optical sensor.

The etching can involve selective etching of portions of the microfluidic device. Example etching chemicals can include titanium oxide, fluorine, carbon tetrafluoride, sulfur hexafluoride, dichlorine, or a combination thereof. In some examples, the etching can be a chemically-assisted physical etch. For example, the etching can include plasma etching, a photoresist, chemically assisted physical etch, acid bath or a combination thereof. In one example, the etching can include a chemically assisted physical etch. The chemically assisted physical etch can include applying pressure and flowing gas. The flowing gas can include a combination of argon, dichlorine, oxygen, sulfur hexafluoride, or a combination thereof.

In some examples, the method can include two etching steps. The first etching can occur through the passivation layer and the dielectric material to expose the optical sensor associated with the microfluidic well, but not the metallic circuitry component(s), such as those positioned beyond the microfluidic well. This etching can include etching with a strong etching chemical. The second etching can occur after depositing an optical filter of a layered composite stack over the optical sensor to remove the portion of the optical filter at a location other than over the optical sensor such as over the metallic circuitry. In an example, the etch-stopping layer can be resistant to the etching chemical thereby acting as a self-stopping etch-stop layer. In another example, a thickness of the etch-stopping layer can provide a time buffer that can allow for depth control during etching. The etch-stopping layer can provide a time cushion, e.g., up to hundreds of seconds, before the etching solution etches beyond the etch-stopping layer. Other details related to this method include those described elsewhere herein in detail pertaining to the devices and systems herein.

Figure 5:
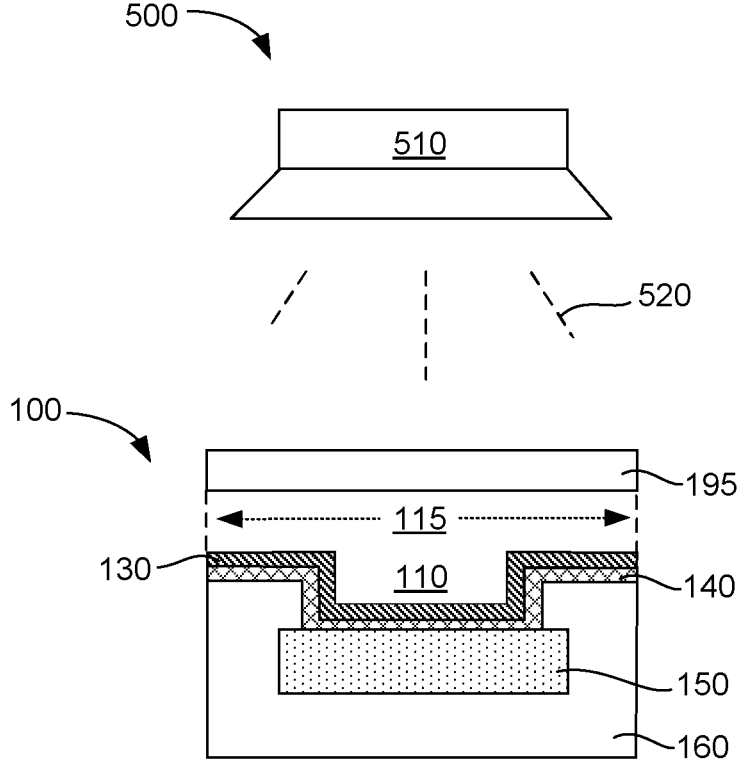
FIG. 5 graphically illustrates a schematic system for conducting a biological assay and includes a cross-sectional view of a microfluidic device in that system in accordance with an example of the present disclosure.

Further presented herein is a system 500 for conducting a biological assay. FIG. 5. The system can include a microfluidic device 100 and an excitation source 510. The microfluidic device can include a microfluidic well 110, a layered composite stack including an optical filter 130 composited with an etch-stopping layer 140, and an optical sensor 150. The optical filter defines the microfluidic well. The term "defines" is inclusive of examples where the optical filter fully defines the region of microfluidic well (except for the open top), or includes examples where the well is defined in part by the optical filter. The optical sensor can be optically associated with the microfluidic well and can have the optical filter positioned therebetween.

In further examples, as briefly mentioned, the microfluidic devices herein can further include lid 195 (or alternatively an upper microfluidic chamber wall). The lid can be any configuration suitable for covering the microfluidic chamber (that includes the microfluidic well), or can be adapted to cover the microfluidic well. The lid can have a thickness that can vary depending on the material of the lid and the particular application for which the microfluidic device can be used. In some examples, the lid can include an inlet port and an outlet port that can be fluidly connected to a microfluidic well or the microfluidic chamber containing the microfluidic well. In some examples, the lid can provide other ports, such as vents or other structures for facilitating fluid flow to or through a microfluidic chamber or microfluidic well thereof. In some examples, the lid can be optically transparent. As an example, the space between the lid and the balance of the device as shown in FIG. 5 can include a microfluidic chamber 115, which includes as a portion thereof, the microfluidic well 110.

In further detail regarding the excitation source 510, this can be positioned to emit electromagnetic energy 520 to be received by the optical sensor 150 through the microfluidic well 110 (and in this example, also through the lid 195 and the portion of the microfluidic chamber 115 there-above). The microfluidic device can be any of the microfluidic devices as described above or illustrated in the figures. Thus, the excitation source can be positioned to emit electromagnetic energy to be received by the optical sensor through the microfluidic well. The microfluidic device can be any of the microfluidic devices as described above or illustrated in the figures. The excitation source, in further detail, can include any device capable of emitting electromagnetic energy toward the optical sensor. Example excitation sources can include an infrared light source, a near infrared light source, laser, light emitting diode, xenon arc lamp, mercury arc lamp, focused sunlight, halogen lamp, or the like.

The excitation source 510 can be operable to emit electromagnetic energy 520 that can interact with a fluorescing agent in a fluid when positioned in the microfluidic well of the microfluidic device. The optical filter can be operable to prevent the emitted electromagnetic energy from reaching the optical sensor and interfering with a measurement of the optical sensor. In some examples, the optical sensor can be associated with a fluorescence detector. The fluorescence detector can include any detector operable to measure fluorescence. In one example, the fluorescence detector can include a fluorimeter, a photoluminescence spectrometer, an excitation light source, an optical filter, or a combination thereof. In yet other examples, the fluorescence detector can include a spectrophotometer. In one example, the fluorescence detector can include an industrial fluorescent microscope, a con-focal fluorescence imaging device, or a single spot multi-excitation and fluorescent multi-label detectors with corresponding bandpass and dichroic filters and mirrors.

The microfluidic devices and systems herein can be used for detection or processing of biological samples, such as fluorescence detection, for example. In further detail, the microfluidic devices and systems may be used for nucleic acid detection and/or amplification. Detection of the nucleic acids may include detecting a fluorescent emission based on the fluorescence of a fluorescing agent interacting with a nucleic acid in the microfluidic well. With respect to nucleic acid amplification, a nucleic acid amplifying fluid may be loaded into the microfluidic well of the microfluidic device or system. The nucleic acid amplifying solution can include components used for amplification, with one example amplifying solution including a polymerase, a nucleotide mix, a magnesium salt, a nucleic acid oligomer, a redox-active intercalating dye, a fluorescent intercalating dye, other type of probes, other secondary reagents, or combination of these or other ingredients thereof. Amplifying a nucleic acid can include polymerase chain reaction (PCR), strand displacement assay, transcription mediated assay, isothermal amplification, loop mediated isothermal amplification, reverse-transcription loop mediated isothermal amplification, nucleic acid sequence based amplification, recombinase polymerase amplification, or multiple displacement amplification. In one example, amplification can include polymerase chain reaction, such as reverse transcription polymerase chain reaction. During amplification, hydrogen bonds on a double-stranded nucleic acid can be denatured and two single strands of nucleic acid can be produced. The excitation electromagnetic energy can be operable to interact with a fluorescing agent in a nucleic acid amplifying solution and generate a fluorescence emission that can be received by the optical sensor of the microfluidic device. Detection of the nucleic acids may also include detecting a fluorescent emission based on the fluorescence of a fluorescent intercalating dye interacting with a nucleic acid in the microfluidic well.

Accordingly, a method of detecting a nucleic acid is also provided herein, and can include loading a solution including a fluorescing agent and a biological sample into a microfluidic well of a microfluidic device. Thus, the microfluidic device can include the microfluidic well, a layered composite stack including an optical filter composited with an etch-stopping layer, and an optical sensor. The method can further include emitting an excitation electromagnetic energy through the solution (including the fluorescing agent and the biological sample to be detected if present). The method can also include optically filtering the excitation electromagnetic energy using the optical filter while passing a fluorescent emission from the sample through to the optical sensor. Upon passing thorough the optical filter, the method can include detecting the fluorescent emission using the optical sensor. Detecting, in some examples, can further include measuring the signal in some examples. Measuring, for example, may include detecting a signal continuously or detecting a signal at set intervals to generated measured data. For example, measuring can include detecting a signal at intervals, such as a time within the range of every 0.1 second to every 10 seconds, every 1 second to every 10 seconds, every 5 seconds to every 60 seconds, every one minute to every five minutes, or some other suitable time frame based on the measurements to be taken.

In some examples, the method can include amplifying a nucleic acid within the microfluidic device using the nucleic acid amplifying fluid. In yet another example, the method can further include thermal cycling the nucleic acid amplifying fluid within the microfluidic well for in situ nucleic acid amplification. Thermal cycling can include denaturing, annealing, and extending nucleic acid chains based on temperature changes. A "thermal cycle" can be defined by the temperatures used for denaturing, annealing, and extending phases of the amplification. An increased temperature can cause hydrogen bonds between bases in a double-stranded nucleic acid sample to break apart resulting in two single strands or nucleic acid realized from a formerly double stranded nucleic acid. During annealing, the heated sample can then be cooled, enabling single stranded nucleic acid oligomers, such as primers, to attach to the complimentary nitrogen bases on the single strands of the nucleic acid. During extending of the nucleic acid chain the temperature may be increased, for example, to enable a polymerase enzyme to extend the nucleic acid strand by adding nucleic acid bases. Regardless of the sequence or heating and cooling and the temperatures that are reached during the heating and cooling phases, thermal cycling can be repeated until a desired number of nucleic acid copies, e.g., DNA, are formed, which can for example take from about 10 to about 50 thermal cycles, or 20 to 45 thermal cycles, or 10 to 30 thermal cycles, in many instances. In some examples, temperature changes can be controlled by an internal heating element of the microfluidic device. In other examples, temperature changes can be controlled by an external heating element. In yet other examples, the method can include cooling utilizing an internal cooling element or an external cooling device.

It is noted that, as used in this specification and the appended claims, the singular forms "a," "an," and "the" include plural referents unless the content clearly dictates otherwise.

As used herein, a plurality of items, structural elements, compositional elements, and/or materials may be presented in a common list for convenience. However, these lists should be construed as though members of the list are individually identified as separate and unique members. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if numerical values and sub-ranges are explicitly recited. For example, a weight ratio range of 1 wt % to 20 wt % should be interpreted to include not only the explicitly recited limits of 1 wt % and 20 wt %, but also to include individual weights such as 2 wt %, 11 wt %, 14 wt %, and sub-ranges such as 10 wt % to 20 wt %, 5 wt % to 15 wt %, etc.

EXAMPLES

The following illustrates examples of the present disclosure. However, it is to be understood that the following are only illustrative of the application of the principles of the present disclosure. Numerous modifications and alternative compositions, methods, and systems may be devised without departing from the spirit and scope of the present disclosure. The appended claims are intended to cover such modifications and arrangements.

Example 1—Assessment of Etch-Stopping Layer on Filter Performance

Two dichroic optical filters having 13 sets of repeating silicon dioxide and silicon nitride material layers (26 individual layers) were tested for percent transmittance. A control includes one of the filters placed over silicon substrate with no other layers applied thereto. The Sample included the other filter, a 0.1 μm titanium dioxide etch-stopping layer, and the silicon substrate applied thereto. The etch-stopping layer was sandwiched between the optical filter and the silicon substrate. A Newport Model 77700 spectrophotometer and a Spectra Physics 66902 housing with a USHIO 300 Watt short arc xenon lamp were placed over the optical filters opposite the silicon substrate. Percent transmittance of the electromagnetic energy was measured using a 3 junction RGB photodiode. The percent transmittance of the Control and the Sample were substantially similar. Accordingly, there was little impact on overall transmittance from the etch-stopping layer.

Example 2—Comparison of Devices Prepared with and without Etch-Stopping Layer Three microfluidic devices were created, namely a Control Device, Device A, and Device B. All of the devices started with an initial filter stack including a substrate, an optical sensor, a dielectric material layer, and a passivation layer. The layers were stacked with the substrate as the bottom layer and the passivation layer as the top layer. Metallic circuitry was interposed between the dielectric material layer and the passivation layer at select locations.

In all of the manufacturing methods described below, a pocket etch was conducted using a photo-resist and applying 120 mTorrs of pressure using 27 MHz power source and a 2 MHz power source. A variety of gases were flowed during etching, including 50 SCCM of argon gas, 200 SCCM carbon tetrafluoride gas, 25 SCCM oxygen gas, and 50 SCCM sulfur hexafluoride gas. Next a filter etch was conducted by applying 120 mTorrs of pressure using 27 MHz power source and a 2 MHz power source. A variety of gases were flowed during etching including 50 SCCM argon gas, 200 SCCM chlorine gas, 25 SCCM oxygen gas, and 50 SCCM sulfur hexafluoride gas. The total time for the filter etch was 200 seconds.

The Control Device was manufactured by conducting a pocket etch of the passivation layer and the dielectric material to form a U-shaped cavity in the initial filter stack exposing the optical sensor. A dichroic filter was then applied over the filter stack covering the portion of the passivation layer that remained, the side walls of the U-shaped cavity and the optical sensor. A filter etch was conducted to remove a portion of the dichroic filter covering the metallic circuitry. This etch also removed a portion of the passivation layer and formed air pockets near the metallic circuitry.

Device A was manufactured by conducting a pocket etch of the passivation layer and the dielectric material to form a u-shaped cavity in the initial filter stack exposing the optical sensor. Depositing a layered composite stack including a 0.1 μm titanium dioxide etch-stopping layer and a dichroic filter over the filter stack covering the portion of the passivation layer that remained, the side walls of the U-shaped cavity and the optical sensor. A filter etch was conducted to remove a portion the dichroic filter covering the metallic circuitry. The etch-stopping layer provided a 50 second time buffer that allowed for complete etching of the portion of the dichroic filter over the metallic circuitry without removing any portion of the passivation layer.

Device B was manufactured by depositing a 0.1 μm titanium dioxide etch-stopping layer over the passivation layer. Conducting a pocket etch of the etch-stopping layer, the passivation layer, and the dielectric material to form a U-shaped cavity in the initial filter stack exposing the optical sensor. Depositing a dichroic filter over the filter stack covering the portion of the etch-stopping layer that remained, the side walls of the U-shaped cavity, and the optical sensor. A filter etch was conducted to remove a portion of the dichroic filter covering the metallic circuitry. The etch-stopping layer provided a 50 second time buffer that allowed for complete etching of a portion of the dichroic filter over the metallic circuitry without removing any portion of the passivation layer.

The Control had exposed metallic circuitry and air pockets near the metallic circuitry. The exposed metallic circuitry and air pockets may cause the microfluidic device to short circuit in operation. In addition, the filter etch resulted in an uneven uppermost layer of the microfluidic device. This lack of depth control may negatively affect the reliability of the Control in operation. The filter etch on both Devices A and B stopped at the etch-stopping layer and resulted in a uniform etch. The incorporation of an etch-stopping layer in these devices provided a time buffer that allowed for complete etching of the optical filter that was located over the metallic circuitry and prevented over-etching of these areas. The incorporation of the etch-stopping layer allows for simplified and quick manufacture of microfluidic devices and prevents issues that occur as a result of over-etching and under-etching.

What is claimed is:

1. A microfluidic device, comprising:
a microfluidic well;
a layered composite stack including an optical filter composited with an etch-stopping layer, wherein the microfluidic well is formed by the optical filter, and
an optical sensor optically associated with the microfluidic well and having the optical filter positioned therebetween:
wherein the etch-stopping layer is optically transparent, is positioned between the optical sensor and the optical filter, and forms the microfluidic well with the optical filter.

2. The microfluidic device of claim 1, wherein the etch-stopping layer is composited with the optical filter at a region beyond the microfluidic well.

3. The microfluidic device of claim 1, further including a metallic circuitry component positioned beyond the microfluidic well and covered by a passivation layer, wherein the etch-stopping layer extends beyond the optical filter and covers the passivation layer over the metallic circuitry component.

4. The microfluidic device of claim 1, wherein the optical filter is selected from a dichroic filter, absorptive filter, monochromatic filter, bandpass filter, Fabry-Perot etalon, antireflective coating, bandstop filter, or a combination thereof.

5. The microfluidic device of claim 1, wherein the optical filter is a dichroic filter which includes between 4 and 250 alternating layers of two or more different types of optically transparent material with different refractive indexes, wherein the etch-stopping layer is also transparent, and wherein the two or more different types of optically transparent material of the dichroic filter are different than the optically transparent material of the etch-stopping layer.

6. The microfluidic device of claim 1, wherein the etch-stopping layer includes an optically transparent material selected from titanium dioxide, zirconium oxide, hafnium oxide, aluminum oxide, indium oxide, tin (IV) oxide, tantalum oxide, silicon carbide, silicon dioxide, silicon nitride, titanium nitride, or a combination thereof.

7. The microfluidic device of claim 1, wherein the etch-stopping layer has a thickness ranging from 0.05 μm to 1 μm.

8. A system for conducting a biological assay, comprising:
a microfluidic device including a microfluidic chamber, the microfluidic device further including:
a microfluidic well included within the microfluidic chamber, a layered composite stack including an optical filter composited with an etch-stopping layer, wherein the microfluidic well is formed by the optical filter, and
an optical sensor optically associated with the microfluidic well and having the optical filter positioned therebetween,
wherein the etch-stopping layer is optically transparent, is positioned between the optical sensor and the optical filter, and forms the microfluidic well with the optical filter, and
an excitation source positioned to emit electromagnetic energy to be received by the optical sensor through the microfluidic well.

* * * * *